Patented June 10, 1941

2,245,539

UNITED STATES PATENT OFFICE 2,245,539

SULPHANILAMIDE PHOSPHORIC ACID DERIVATIVE AND PROCESS FOR THE MANUFACTURE THEREOF

Kurt Warnat, Basel, Switzerland, assignor to Hoffmann-La Roche Inc., Nutley, N. J., a corporation of New Jersey No Drawing. Application July 19, 1939, Serial No. 285,439. In Germany July 29, 1938

16 Claims. (Cl. 260—237)

By heating 4-amino benzene sulphonamides with phosphorus oxychloride, phosphoric acid dichlorides of 4-amino benzene sulphonamides are obtained. These phosphoric acid dichlorides of 4-amino benzene sulphonamides can be transformed into phosphoric acids or phosphamic acids having a strong bactericidal action by reaction with alkalis or amines.

It has now been found that particularly valuable compounds with a bactericidal action can be obtained from these phosphoric acid derivatives of 4-amino benzene sulphonamides if they are reacted with alkaloids or other bases used in therapy, such, as, for instance, quinoline acridine or opium bases, cocaine, basic esters of aromatic carboxylic acids, such as ethyl aminobenzoate. The manufacture of the new compounds is effected by neutralisation of the base with a 4-amino benzene sulphonamide phosphoric or phosphamic acid or by reaction of an easily soluble salt of a suitable base with a salt of a 4-amino benzene sulphonamide phosphoric or phosphamic acid. These reactions may take place in the cold or on heating. The salts thus obtained crystallise out or can be isolated in the solid state by evaporation. The solution of the salts, which has a neutral reaction, may also be directly filled into ampoules for injection purposes.

The novel compounds in accordance with the present invention are of the following general formula:

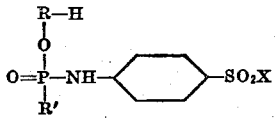

wherein R is a radical of a therapeutically employable base, R' is a radical selected from the group consisting of —OH and —NH$_2$ radicals, and X is selected from the group consisting of amino, alkyl amino, aralkyl amino and amino pyridyl amino radicals.

Example 1

119 parts by weight of quinine monohydrochloride are dissolved in 1200 parts by weight of water. To this solution heated to 50° C. a solution of 92.7 parts by weight of the crystalline sodium salt of sulphanilamide phosphamic acid in 800 parts by weight of water is added. After a short time, the quinine salt of sulphanilamide phosphamic acid crystallises. It is sucked off, washed with water and dried. The compound has the formula $C_{20}H_{24}O_2N_2.C_6H_{10}O_4N_3SP$ and is difficultly soluble in cold water.

Example 2

64.8 parts by weight of quinine purum anhydricum are suspended in 1500 parts by weight of water at 40–50° C. and neutralised with moist, freshly precipitated sulphanilamide phosphamic acid (containing 50.2 parts by weight of

$C_6H_{10}O_4N_3SP$)

while stirring. The compound described in Example 1 is obtained.

Example 3

8.6 parts by weight of hydroquinine sulphate are dissolved in water. By addition of alkali or ammonia the hydroquinine base is precipitated, sucked off and washed with water. The moist base is neutralised in 150 parts by weight of water by addition of 5 parts by weight of sulphanilamide phosphamic acid, whereupon the hydroquinine salt of sulphanilamide phosphamic acid soon crystallises in well-developed needles. The salt has the formula

$C_{20}H_{26}O_2N_2.C_6H_{10}O_4N_3SP$ and is easily soluble in hot water, difficulty soluble in cold water.

Example 4

The solutions of 52.1 parts by weight of tyramine hydrochloride in 300 parts by weight of warm water and 92.7 parts by weight of crystalline sulphanilamide phosphamic acid sodium in 400 parts by weight of water are cooled to room temperature and then poured together. After a short time, the sulphanilamide prosphamic acid salt of tyramine crystallises in large crystals. The compound has the formula

$C_8H_{11}ON.C_6H_{10}O_4N_3SP$

It is easily soluble in hot water, but also moderately soluble in cold water.

Example 5

38.8 parts by weight of emetine hydrochloride (Pharmacopoea Helvetica V) are dissolved in water and precipitated with a solution of caustic soda at about 40° C. The precipitated emetine base is sucked off and washed with water. The moist base is suspended in 100 parts by weight of water. By neutralisation with moist sulphanilamide phosphamic acid (25.1 parts by weight of $C_6H_{10}O_4N_3SP$) a clear neutral solution of the sulphanilamide phosphamic acid salt of emetine, $C_{33}H_{40}O_5N_2.2C_6H_{10}O_4N_3SP$, is obtained which can be directly used for injection purposes after dilution. If the salt is to be obtained in a solid state, the solution is evaporated to a small volume and precipitated with alcohol. The compound is easily soluble in cold water.

Example 6

46.4 parts by weight of hordenine sulphate and 61.8 parts by weight of the crystalline sodium salt of sulphanilamide phosphamic acid are each dissolved in 200 parts by weight of water by heating and the two solutions poured together. After a while, the sulphanilamide phosphamate of hordenine $C_8H_{15}ON.C_6H_{10}O_4N_3SP$ crystallises. It can be purified by crystallisation from a little water.

Example 7

28 parts by weight of hexamethylene tetramine are dissolved in 75 parts by weight of water and 50 parts by weight of freshly precipitated moist sulphanilamide phosphamic acid (from 62 parts by weight of crystalline sodium sulphanilamide phosphamate) introduced. The mixture is shaken for 10–15 minutes whereby the sulphanilamide phosphamate of hexamethylene tetramine separates in granular crystals in nearly quantitative yield. It is sucked off, washed with a little cold water and dried. The salt is rather difficulty soluble in cold water and decomposes at 202–203° C.

Example 8

A solution of hexamethylene tetramine is prepared from 50 parts by weight of 36 per cent formalin and about 30 parts by weight of 25 per cent ammonia, and 25 parts by weight of freshly precipitated sulphanilamide phosphamic acid introduced either directly or after concentration to 40 parts by weight. When the reaction has come to an end, the reaction product is sucked off. The sulphanilamide prosphamate of hexamethylene tetramine described in Example 7 is obtained in good yield.

Example 9

9 parts by weight of 2-methoxy-6-chloro-9-α-diethylamino-δ-pentylamino acridine dihydrochloride are dissolved in water and the acridine base precipitated by addition of soda. The base is neutralised by 9.8 parts by weight of sulphanilamide phosmamic acid suspended in 100 parts by weight of water. A clear, yellow, neutral solution of the sulphanilamide phoshamate of 2 - methoxy - 6 - chloro-9-α-diethylamino-δ-pentylamino acridine is obtained which can be directly used for injection purposes.

Example 10

2 parts by weight of N-diethylamino isopentyl-8-amino-6-methoxy quinoline base in a little water are neutralised with 3.3 parts by weight of sulphanilamide phosphamic acid with gentle heating. Part of the sale formed crystallises out. A further quantity can be obtained by concentration of the mother liquors. The salt is moderately soluble in water giving a yellow solution.

Example 11

4 parts by weight of 2-ethoxy-6,9-diamino acridine are neutralised in 40 parts by weight of water and 4.5 parts by weight of sulphanilamide phosphamic acid. The sulphanilamide phosphamate of 2-ethoxy-6,9-diamino acridine forms a yellow powder which is sucked off, washed with a small quantity of water and dried.

I claim:
1. The quinine salt of sulphanilamide phosphamic acid.
2. A salt of sulphanilamide phosphamic acid with a therapeutically employable acridine base.
3. The 2-methoxy-6-chloro-9-α-diethylamino-δ-pentylamino acridine salt of sulphanilamide phosphamic acid.
4. The hexamethylene tetramine salt of sulphanilamide phosphamic acid.
5. Process for the manufacture of the quinine salt of sulphanilamide phosphamic acid, comprising reacting sulphanilamide phosphamic acid with quinine perum anhydricum.
6. Process for the manufacture of salts of sulphanilamide phosphamic acid with therapeutically employable acridine bases, comprising reacting sulphanilamide phosphamic acid with acridine derivatives.
7. Process for the manufacture of the 2-methoxy - 6 - chloro-9-α-diethylamino-δ-pentyl-amino acridine salt of sulphanilamide phosphamic acid, comprising reacting sulphanilamide phosphamic acid with 2-methoxy-6-chloro-9-α-diethylamino-δ-pentylamino acridine.
8. Process for the manufacture of the hexamethylene tetramine salt of sulphanilamide phosphamic acid, comprising reacting sulphanilamide phosphamic acid with hexamethylene tetramine.
9. Process for the manufacture of a quinine salt of sulphanilamide phosphamic acid, comprising reacting a compound selected from the group consisting of sulphanilamide phosphamic acid and its salts with a compound selected from the group consisting of quinine and the salts thereof, respectively.
10. A compound of the general formula

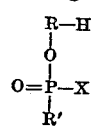

wherein R is a radical of a therapeutically employable base, R' is a radical selected from the group consisting of —NH and —OH radicals, and —X is a radical of a therapeutically active 4-amino-benzene sulphonamide which is attached to the P atom through the 4-amino nitrogen atom.

11. A compound of the general formula

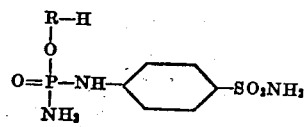

R being a radical of a therapeutically employable base.

12. A compound of the general formula

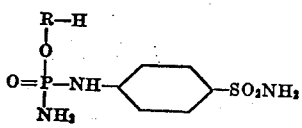

R being a radical of a therapeutically employable organic base having at least four carbon atoms and one nitrogen atom, the molecule thereof possessing at least one ring system.

13. A compound of the general formula

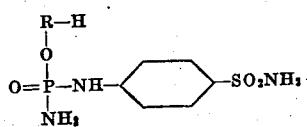

R being a radical of a therapeutically employable base containing a quinoline nucleus.

14. The process for the manufacture of compounds of the general formula

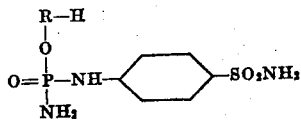

R being a radical of a therapeutically employable base, comprising reacting compounds of the general formula

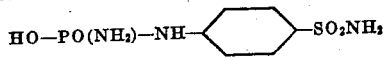

with therapeutically employable bases.

15. The process for the manufacture of compounds of the general formula

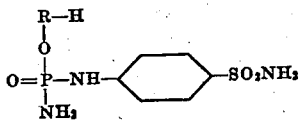

R being a radical of a therapeutically employable organic base having at least four carbon atoms and one nitrogen atom, the molecule thereof possessing at least one ring system, comprising reacting compounds of the general formula

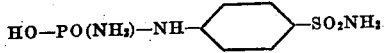

with a therapeutically employable organic base having at least four carbon atoms and one nitrogen atom and the molecule thereof possessing at least one ring system.

16. The process for the manufacture of compounds of the general formula

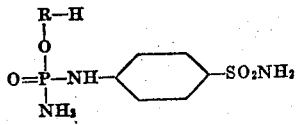

R being a radical of a therapeutically employable base containing a quinoline nucleus, comprising reacting compounds of the general formula

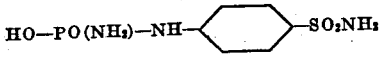

with therapeutically employable bases containing a quinoline nucleus.

KURT WARNAT.